(12) United States Patent
Pan et al.

(10) Patent No.: US 11,120,289 B2
(45) Date of Patent: Sep. 14, 2021

(54) PARALLEL HISTOGRAM CALCULATION WITH APPLICATION TO PALETTE TABLE DERIVATION

(71) Applicant: ATI Technologies ULC, Markham (CA)

(72) Inventors: Feng Pan, Richmond Hill (CA); Wei Gao, Aurora (CA); Yang Liu, Toronto (CA); Crystal Yeong-Pian Sau, Scarborough (CA); Haibo Liu, North York (CA); Edward A. Harold, Scarborough (CA); Ying Luo, Richmond Hill (CA); Ihab Amer, Stouffville (CA); Gabor Sines, Toronto (CA)

(73) Assignee: ATI Technologies ULC, Markham (CA)

(*) Notice: Subject to any disclaimer, the term of this patent is extended or adjusted under 35 U.S.C. 154(b) by 144 days.

(21) Appl. No.: 16/588,810

(22) Filed: Sep. 30, 2019

(65) Prior Publication Data
US 2021/0097327 A1 Apr. 1, 2021

(51) Int. Cl.
*G06K 9/46* (2006.01)
*G06T 5/40* (2006.01)
(Continued)

(52) U.S. Cl.
CPC ......... *G06K 9/4647* (2013.01); *G06K 9/6212* (2013.01); *G06T 5/40* (2013.01); *H04N 19/186* (2014.11); *H04N 19/423* (2014.11)

(58) Field of Classification Search
CPC ....... H04N 19/00024; H04N 19/00139; H04N 19/00315; H04N 19/00448;
(Continued)

(56) References Cited

U.S. PATENT DOCUMENTS 9,870,617 B2 * 1/2018 Piekniewski ............ G06K 9/48
2004/0071362 A1 * 4/2004 Curry ...................... G06T 5/001
382/274

(Continued)

OTHER PUBLICATIONS

International Search Report and Written Opinion in International Application No. PCT/IB2020/059176, dated Dec. 1, 2020, 6 pages.

*Primary Examiner* — Duy M Dang
(74) *Attorney, Agent, or Firm* — Rory D. Rankin; Kowert, Hood, Munyon, Rankin & Goetzel, P.C.

(57) ABSTRACT

Systems, apparatuses, and methods for performing parallel histogram calculation with application to palette table derivation are disclosed. An encoder calculates a first histogram for a first portion of pixel component value bits of a block of pixels. Then, the encoder selects a first number of the highest pixel count bins from the first histogram. Also, the encoder calculates a second histogram for a second portion of pixel component value bits of the block. The encoder selects a second number of the highest pixel count bins from the second histogram. A third histogram is calculated from the concatenation of bits assigned to the first and second number of bins, and the highest pixel count bins are selected from the third histogram. A palette table is derived based on these highest pixel count bins selected from the third histogram, and the block of pixels is encoded using the palette table.

20 Claims, 12 Drawing Sheets

(51) Int. Cl.
*H04N 19/423* (2014.01)
*H04N 19/186* (2014.01)
*G06K 9/62* (2006.01)

(58) Field of Classification Search
CPC .......... H04N 1/40012; H04N 1/40018; H04N 1/40025; H04N 1/40031; H04N 1/46; H04N 1/54; H04N 1/56; H04N 1/60; H04N 1/6025; H04N 1/40037; H04N 1/40043; H04N 1/4005; H04N 1/40056; H04N 1/40062; H04N 1/40068; H04N 1/40075; G06T 15/205; G06T 7/90; G06T 2207/20081; G06T 2207/20084; G06T 2207/10024; G06N 3/02; G06N 3/04
See application file for complete search history.

(56) References Cited

U.S. PATENT DOCUMENTS

| | | |
|---|---|---|
| 2015/0186100 A1 | 7/2015 | Tsai et al. |
| 2015/0281703 A1 | 10/2015 | Zou et al. |
| 2017/0091947 A1* | 3/2017 | Baruch .................... G06T 5/40 |

* cited by examiner

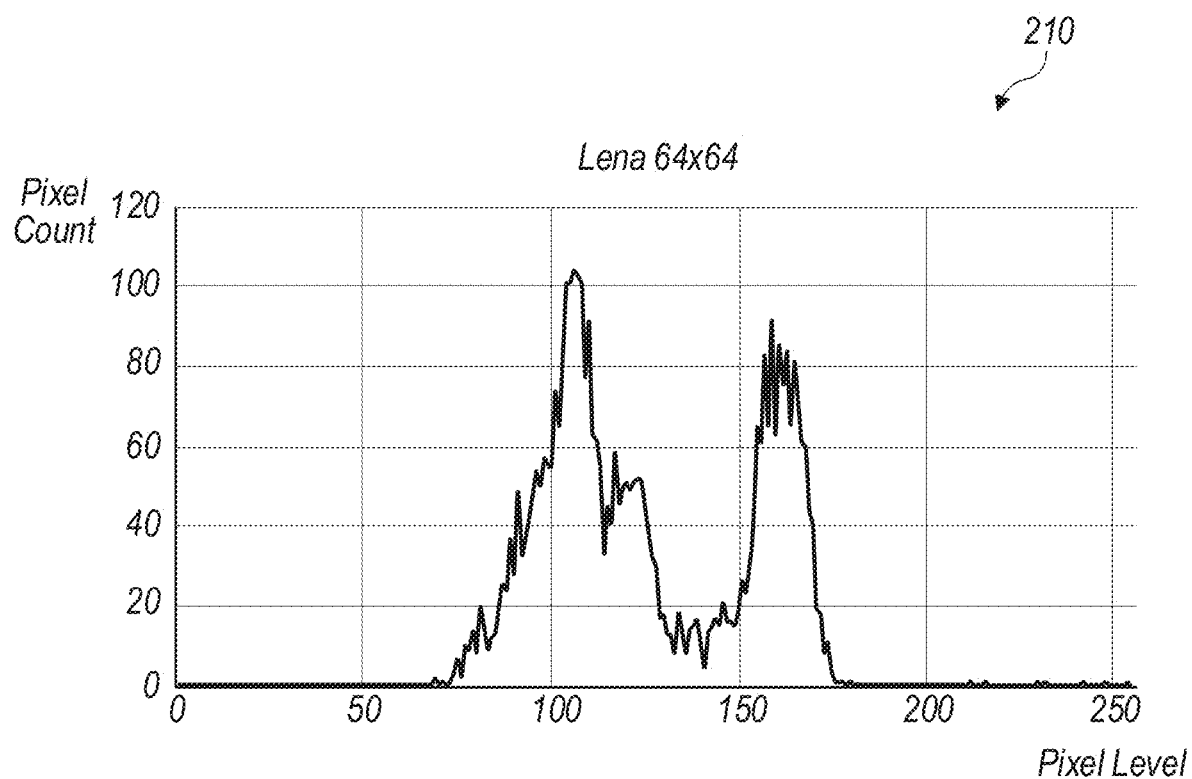
FIG. 2

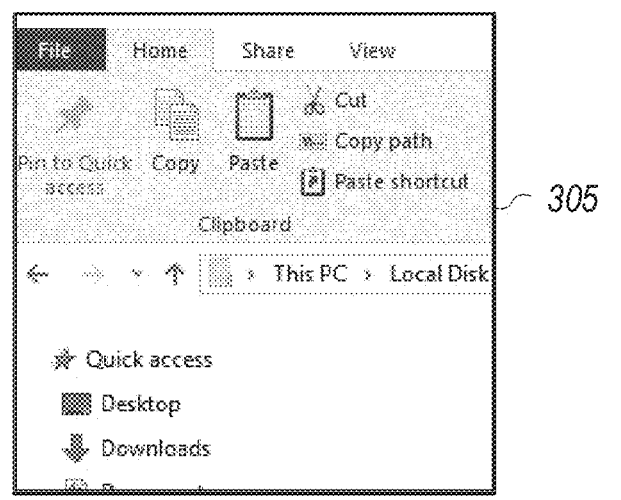
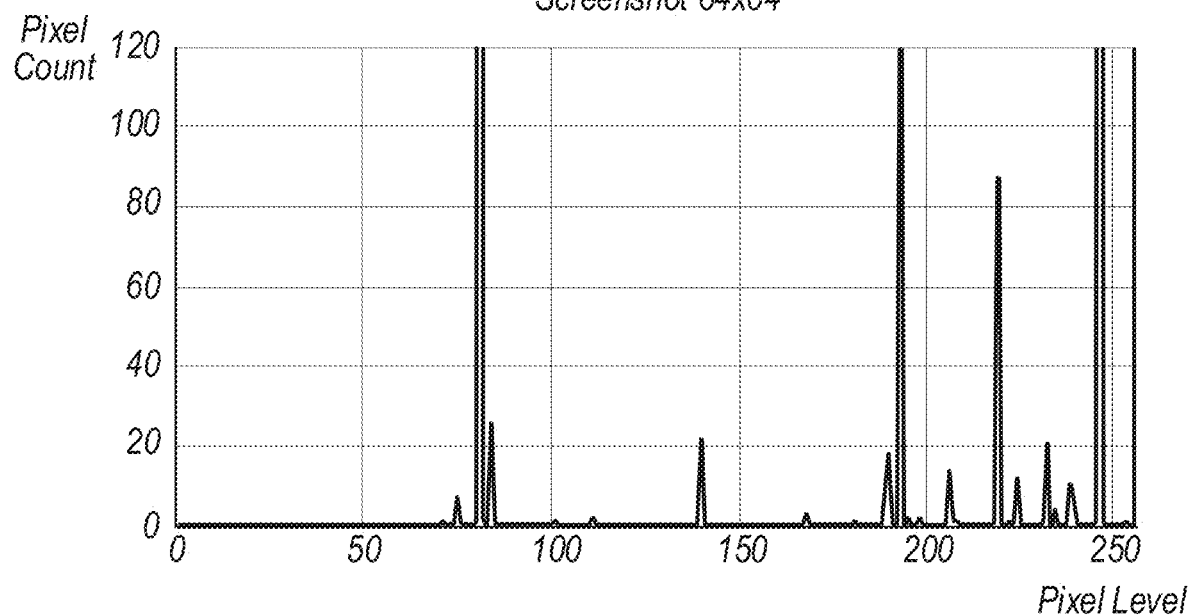
FIG. 3

PARALLEL HISTOGRAM CALCULATION WITH APPLICATION TO PALETTE TABLE DERIVATION

BACKGROUND

Description of the Related Art

Palette coding is used in several video compression standards (e.g., high efficiency video coding (HEVC) standard, Alliance for Open Media video 1 (AV1) coding standard) to increase the compressibility of the video data. Palette coding involves calculating and sorting a histogram to determine the candidate palette levels. The size of storage needed for histogram calculation for palette table derivation increases exponentially with the pixel bit depth. As used herein, the term "palette table" is defined as a data structure that stores a plurality of entries, with each entry storing an index which maps to a pixel component value. For 8-bit, 10-bit, and 12-bit video, the required number of histogram bins are 256, 1024, and 4096, respectively, for traditional palette coding techniques.

BRIEF DESCRIPTION OF THE DRAWINGS

The advantages of the methods and mechanisms described herein may be better understood by referring to the following description in conjunction with the accompanying drawings, in which:

FIG. 2 is a diagram of an image and corresponding pixel distribution.

FIG. 3 is a diagram of a computer-generated screen content image and corresponding pixel distribution.

DETAILED DESCRIPTION OF IMPLEMENTATIONS

Figure 1:
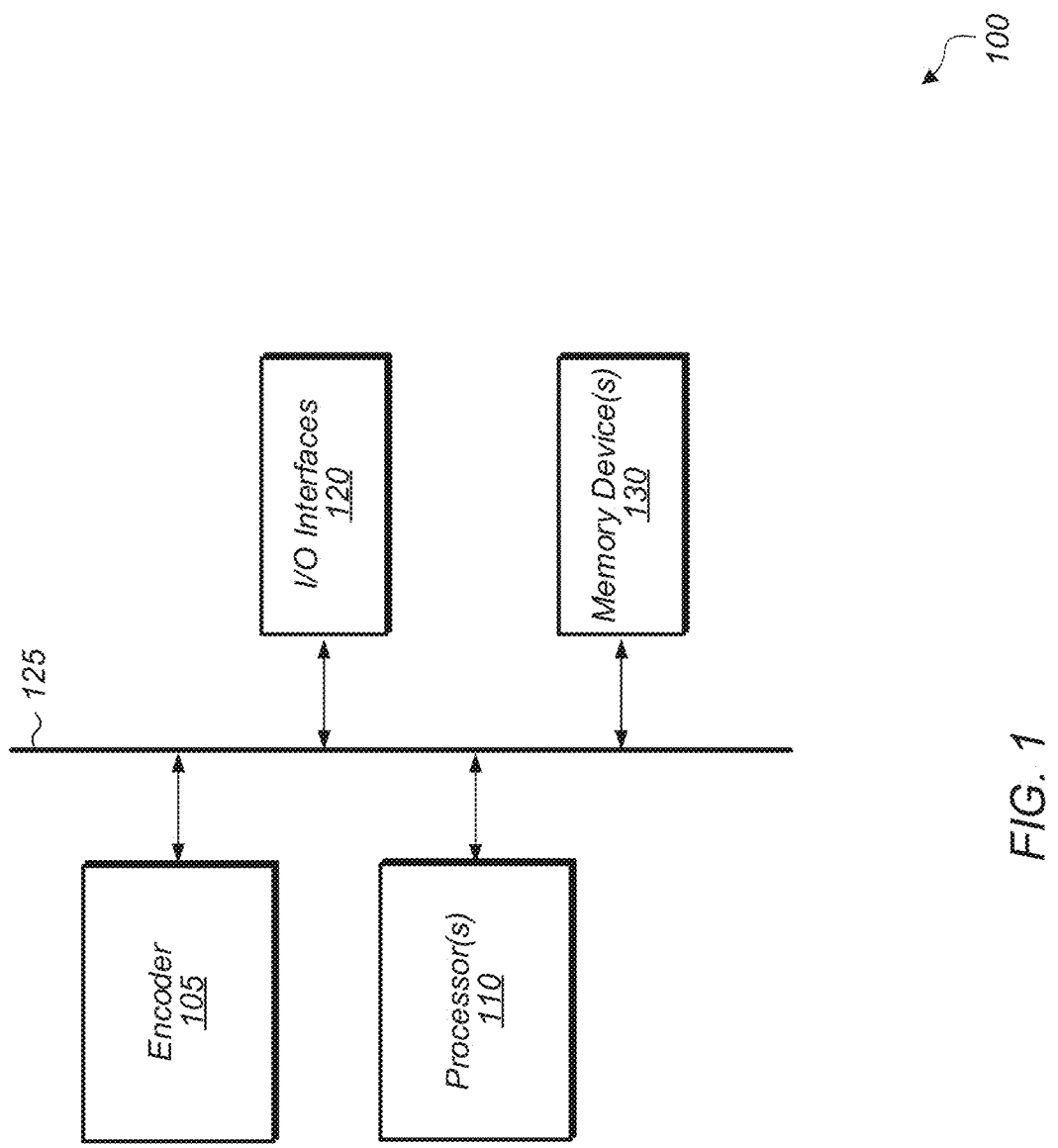
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing parallel histogram calculation with application to palette table derivation are disclosed herein. In one implementation, an encoder calculates a first histogram for a first portion of bits of pixel component values (i.e., color values) of a block of an image or video frame. Then, the encoder selects a first number of the highest pixel count bins from the first histogram. Also, the encoder calculates a second histogram for a second portion of pixel component value bits of the block and the encoder selects a second number of the highest pixel count bins from the second histogram. In one implementation, the second histogram is calculated in parallel with the first histogram. A third histogram is calculated from the concatenation of bits assigned to the first number of bins with bits assigned to the second number of bins, and the highest pixel count bins are selected from the third histogram. A palette table is derived based on these highest pixel count bins selected from the third histogram, and the block is encoded using the palette table. By using the parallel multi-histogram approach, the memory requirements are reduced as compared to traditional palette table derivation techniques.

In one implementation, the bits of the given pixel component are divided into two groups for parallel operation. The "m" most significant bits (MSBs) form a first group and the "n" least significant bits (LSBs) form a second group, where "m" and "n" are positive integers. A first histogram is calculated for the "m" MSBs, and then the top bins from the first histogram are selected. A second histogram is calculated for the "n" LSBs, and then the top bins from the second histogram are selected. A third histogram is calculated for a concatenation of bits assigned to the top bins from the first histogram with bits assigned to the top bins from the second histogram. For example, if "101" is assigned to a top bin from the first histogram and "001" is assigned to a top bin from the second histogram, the third histogram will include the bin "101001". In this example, it is assumed that the given pixel component has a pixel bit depth of six bits. In other implementations, other pixel bit depths can be used. The third histogram includes all permutations of top bins from the first histogram with top bins from the second histogram. The top bins from the third histogram are then selected and used for palette table derivation. It is noted that the values of "m" and "n", the number of top bins that are selected, and the number of histograms that are calculated are flexible and can vary with the implementation. These values are adjusted based on a tradeoff between a simple hardware implementation and performance.

Referring now to FIG. 1, a block diagram of one implementation of a computing system 100 is shown. In one implementation, computing system 100 includes at least encoder 105, processor(s) 110, input/output (I/O) interfaces 120, bus 125, and memory device(s) 130. In other implementations, computing system 100 can include other components and/or computing system 100 can be arranged differently. In one implementation, encoder 105 includes logic and/or processing elements for implementing a video codec. The video codec encodes uncompressed video streams and/or decodes compressed video streams. In one implementation, the video codec operates in accordance with one or more video compression standards. It is noted that as used herein, the terms "encoder" and "video codec" can refer to a video/image decoder, a video/image encoder, or a video codec. Encoder 105 is representative of any suitable combination of hardware and/or software. Although encoder 105 is shown as a separate unit distinct from processor(s) 110, it should be understood that a portion or the entirety of encoder 105 can execute or be implemented on processor(s) 110.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with encoder 105 is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by encoder 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, graphics card, system on a chip, integrated circuit, streaming device, wearable device, a portion of any of these devices or systems, or any of various other types of computing systems or devices or portions thereof. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Turning now to FIG. 2, a diagram of an image 205 and corresponding pixel distribution 210 is shown. The image 205 shown in FIG. 2 is the well-known Lena image which is widely used as a test image in image processing. The pixel distribution 210 for this 64×64 Lena image 205 is shown at the bottom of FIG. 2. The pixel distribution 210 illustrates how the pixels in image 205 are distributed across the different pixel values. Having a continuous color tone as shown in pixel distribution 210 is common for natural images or video frames captured by a camera.

Referring now to FIG. 3, a diagram of a computer-generated screen content image 305 and corresponding pixel distribution 310 is shown. Image 305 is one example of a computer-generated screenshot, and the pixel distribution 310 shows how there is a narrow distribution of pixels across a relatively small number of pixel levels (i.e., pixel component values). As shown in pixel distribution, image 305 includes a limited few distinct colors. This is a common type of distribution for computer-generated screen content, and for these types of computer-generated images, palette coding is an efficient way of encoding these images to achieve a high compression ratio. Other types of images besides computer-generated screenshots can also benefit from palette coding.

Figure 4:
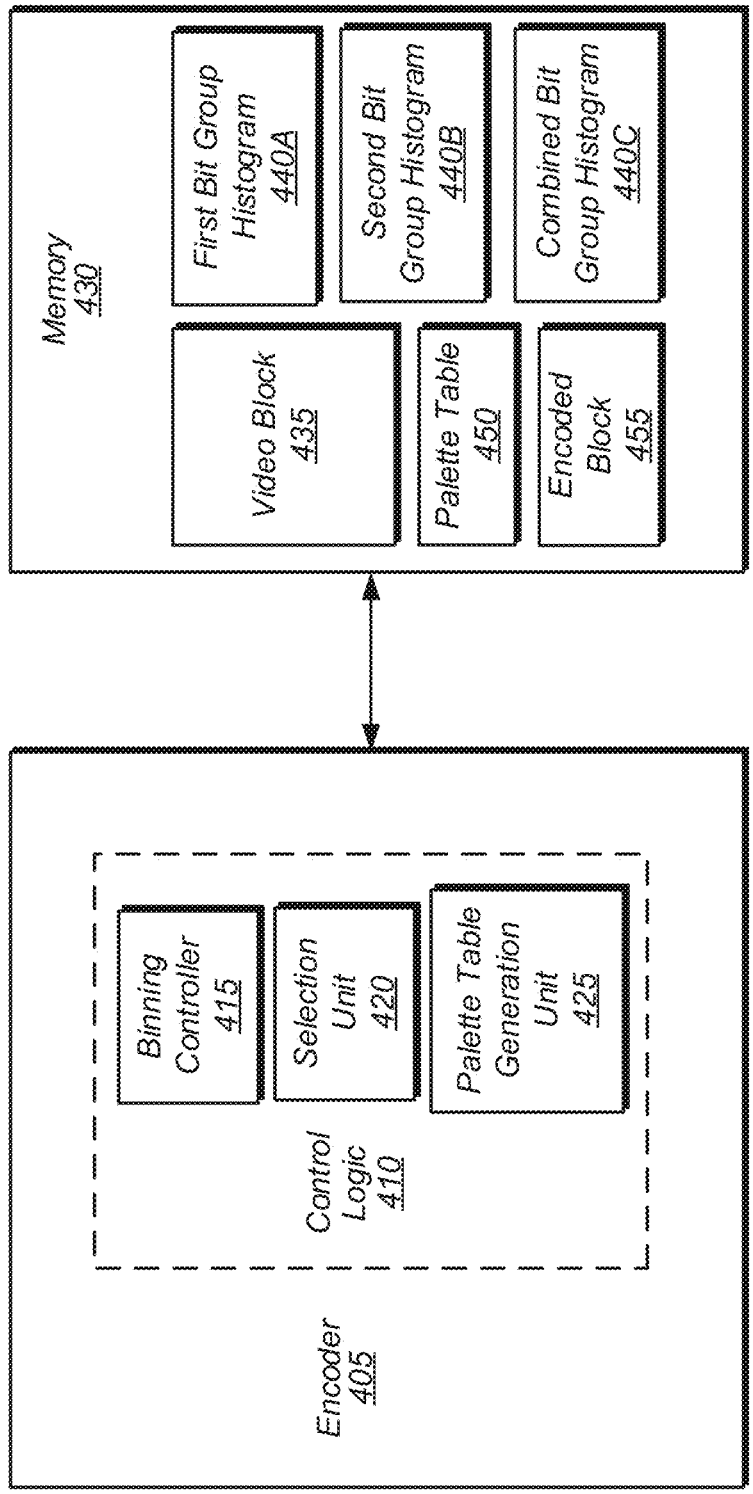
FIG. 4 is a block diagram of one implementation of an encoder coupled to a memory.

Turning now to FIG. 4, a block diagram of one implementation of an encoder 405 coupled to a memory 430 is shown. In one implementation, encoder 405 includes control logic 410 with binning controller 415, selection unit 420, and palette table generation unit 425. In another implementation, encoder 405 is implemented by a processor executing program instructions, and in this implementation, binning controller 415, selection unit 420, and palette table generation unit 425 are implemented by program instructions rather than with control logic. In other implementations, binning controller 415, selection unit 420, and palette table generation unit 425 are implemented using a combination of hardware and software.

Encoder 405 is coupled to memory 430, which is representative of any number and type of memory devices. In one implementation, memory 430 stores a video frame which will be encoded by encoder 405. Video block 435 is representative of one of the blocks of this video frame. The techniques used for encoding video block 435 can be used for the other blocks of the video frame and for other video frames in the video sequence. Alternatively, video block 435 can be a single block of an image. In one implementation, video block 435 is stored as a plurality of pixel component values in memory 430. As part of the encoding process, binning controller 415 creates first bit group histogram 440A from a first subset of bits of the pixel component values of video block 435. In one implementation, the first subset of bits are some number of the MSBs of the pixel component values. In one implementation, binning controller 415 creates a separate first bit group histogram 440A for each separate pixel component (e.g., red, green, blue). To create first bit group histogram 440A, binning controller 415 defines a plurality of bins corresponding to all of the different possible bit-values for the first subset of bits. Next, binning controller 415 counts how many pixel component values from video block 435 fall into each bin. For example, in one implementation, binning controller 415 retrieves the pixel component values of video block 435, and then binning controller 415 allocates each pixel component value to its corresponding bin. In one implementation, each bin is implemented using a counter which is incremented each time that a pixel is allocated to the respective bin.

In one implementation, each bin of first bit group histogram 440A represents a range of pixel component values corresponding to a given number of MSBs. The given number of MSBs can vary according to the implementation. For example, in one implementation, each bin of first bit group histogram 440A represents a range corresponding to four MSBs out of a total of eight bits per pixel component value. By using less than the total number of bits to generate the bins of first bit group histogram 440A, the storage requirements for storing first bit group histogram 440A in memory 430 are reduced. For example, if four MSBs out of eight bits are used to generate first bit group histogram 440A, then only 16 bins are created as compared to 256 bins if all eight bits were used. In this example, each pixel component value is allocated to its respective bin by binning controller 415 based on the value's 4 MSBs.

After first bit group histogram 440A is generated and stored in memory 430, the bins of first bit group histogram 440A are sorted by selection unit 420. For example, the bins are sorted from highest to lowest based on how many pixel values fall into each bin. Then, selection unit 420 selects a given number of the bins that have the most pixel values. For example, in one implementation, selection unit 420 selects the eight bins that have the most pixel values. In other implementations, selection unit 420 selects other numbers of bins that have the highest pixel count (i.e., highest number of pixel values) among all of the bins in first bit group histogram 440A. In parallel to calculating first bit group histogram 440A, second bit group histogram 440B is generated for a second subset of pixel component value bits. For example, in one implementation, the four LSBs are used for calculating second bit group histogram 440B. As with first bit group histogram 440A, the bins of second bit group histogram 440B are sorted according to how many pixel values fall into each bin. Then, the top bins are selected according to the pixel value count. The number of top bins that are selected varies according to the implementation. In one implementation, the top eight bins are selected from second bit group histogram 440B by selection unit 420.

In one implementation, the top bins that are selected from first bit group histogram 440A are combined with the top bins that are selected from second bit group histogram 440B and used to generate combined bit group histogram 440C. For example, in one implementation, the MSBs assigned to the top bins from first bit group histogram 440A are concatenated with the LSBs assigned to the top bins from second bit group histogram 440B to form the bins of combined bit group histogram 440C. The number of pixels that fall into each bin are counted, and then the top bins, in terms of pixel count, are selected. These top bins are used by palette table generation unit 425 to derive the palette table 450 that is used for encoding video block 435 to create encoded block 455. In some cases, encoder 405 will decide not to use palette mode encoding for video block 435 if the distribution of pixel values are spread across a large number of bins as is commonly found in natural (i.e., non-computer-generated) video frames. Depending on the implementation, the decision not to use palette mode encoding can be made after first bit group histogram 440A is generated, after second bit group histogram 440B is generated, or after combined bit group histogram 440C is generated. An analysis of one or more of these histograms 440A-C can determine whether palette mode encoding is suitable for video block 435. In cases where palette mode encoding is not used, any of various other types of conventional encoding techniques can be used to encode video block 435.

It is noted that the above-described process can be performed on the entirety of a video frame or a portion thereof. Also, a palette table that is generated for an entire video frame can be used for encoding subsequent video frames in the video stream. It is also noted that video block 435 can be a block of an image in another implementation. It should be understood that the partitioning of control logic 410 into binning controller 415, selection unit 420, and palette table generation unit 425 is merely indicative of one implementation. In another implementation, a single control unit can perform the functions of binning controller 415, selection unit 420, and palette table generation unit 425. In other implementations, other ways of partitioning control logic 410 into separate units can be deployed.

In one implementation, encoded block 455 includes an encoded version of palette table 450 and a color index map with index values that map pixels of video block 435 to palette table 450. Palette table 450 is representative of any number of palette tables for encoding the pixel components of video block 435. For example, in one implementation, palette table 450 includes a first table for the red component, a second table for the green component, and a third table for the blue component. In another implementation, palette table 450 is a single table that represents a combination of the different pixel components. The color index map that is generated can be encoded using any suitable encoding technique. For example, the individual index values are encoded using a run-length encoding technique in one implementation. Other ways of encoding the individual index values are possible and are contemplated.

Figure 5:
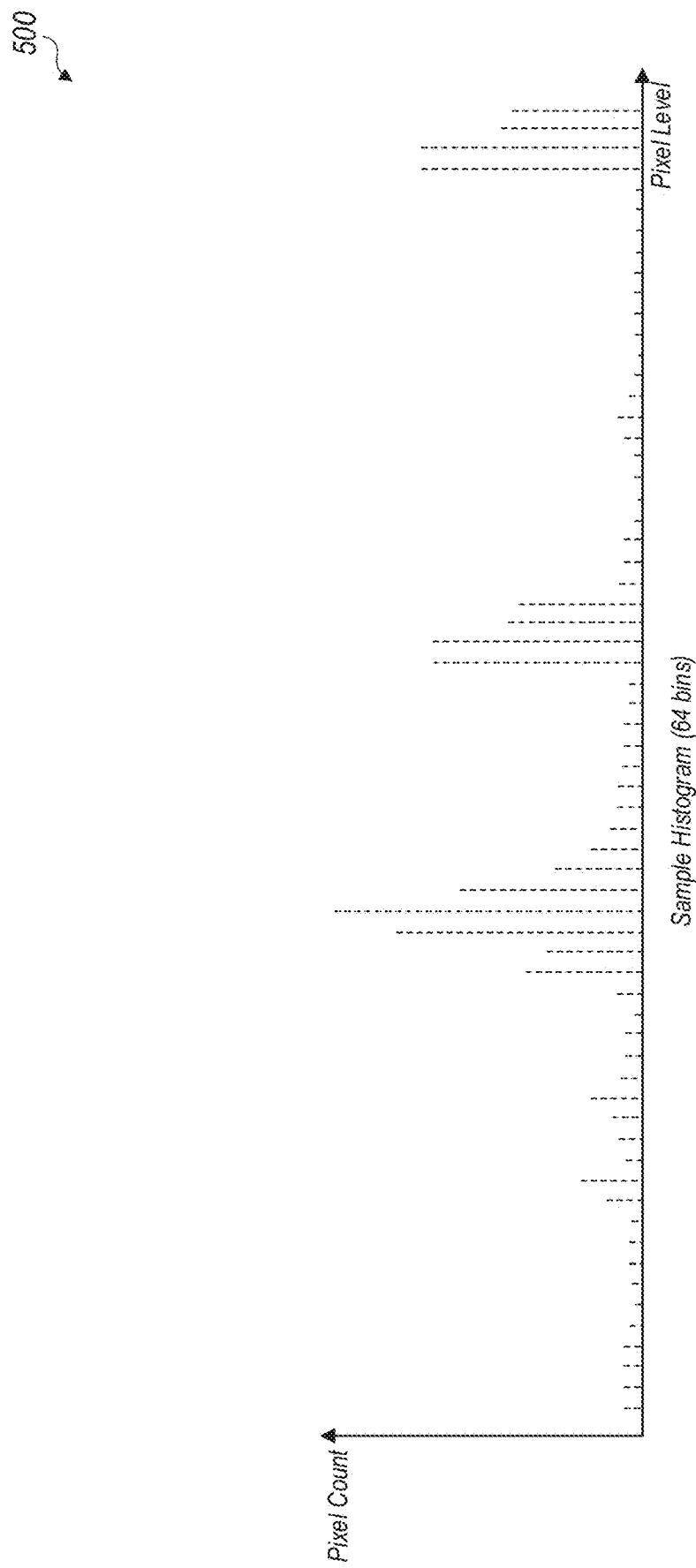
FIG. 5 illustrates a sample histogram for a given block in accordance with one implementation.

Referring now to FIG. 5, one implementation of a sample histogram 500 for a given block is shown. Histogram 500 is one example of a histogram with 64 different bins corresponding to 64 possible pixel levels. As used herein, the term "histogram" is defined as an occurrence frequency of each pixel component value for a given block of an image/frame. It is noted that a block can be referred to more generally as a "coding unit", with the size of the coding unit varying according to the implementation. In one implementation, a coding unit is an 8×8 block of pixels. In another implementation, a coding unit is the entirety of the image/frame. In other implementation, a coding unit can be other sizes and/or arrangements of pixels. The example distribution of histogram 500 is shown for illustrative purposes only. The Y-axis measures the number of pixels in the given block which have the corresponding pixel level. It is assumed for the purposes of this discussion that the given block has a plurality of pixels and each pixel has a numerical value for each of one or more channels (e.g., red, green, blue).

To generate histogram 500, storage for 64 separate bins is required. For other histograms with other numbers of bits per pixel component, other numbers of bins would be required when generating a histogram for every possible pixel level. For example, for a 10-bit pixel component, 1024 storage bins would be needed. For a 12-bit pixel component, 4096 storage bins would be needed. As the number of bits per pixel component level (i.e., pixel bit depth) increases, the storage requirements increase exponentially. However, with the techniques presented herein, the storage requirements for generating histograms for high-bit-depth video are substantially reduced.

Figure 6:
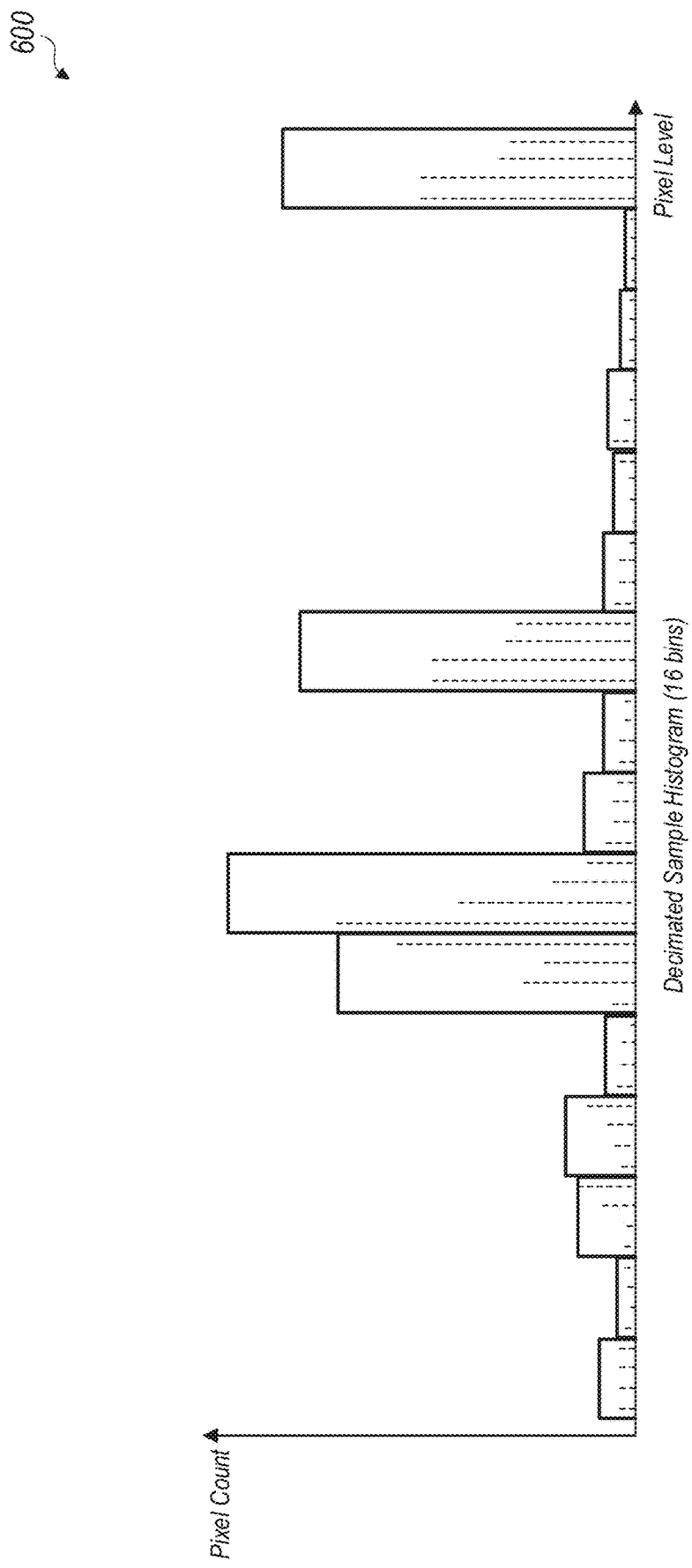
FIG. 6 illustrates a decimated sample histogram for a given block of pixels in accordance with one implementation.

Turning now to FIG. 6, a diagram of one implementation of a decimated sample histogram 600 for a given block of pixels is shown. The discussion of FIG. 6 is a continuation of the discussion of histogram 500 from FIG. 5. Histogram 600 includes the same distribution of pixels across pixel component levels as was shown in histogram 500, except that now each bin encompasses a plurality of pixel component levels. Accordingly, histogram 600 has a reduced number of bins by evaluating only a subset of the bits of each pixel.

As shown in histogram 600, each rectangle is an intermediate bin which is the congregation of four bins. In this example, histogram 600 evaluates the four most significant bits (MSBs) of the pixel component values. Using only four MSBs corresponds to a total of 16 bins. This helps to reduce the storage requirements of 64 bins (for histogram 500 of FIG. 5) to 16 bins for histogram 600. In other implementations, a first histogram can evaluate other numbers of MSBs. In one implementation, while first histogram 600 is being generated for the MSBs, a second histogram (not shown) is generated for the LSBs.

Figure 7:
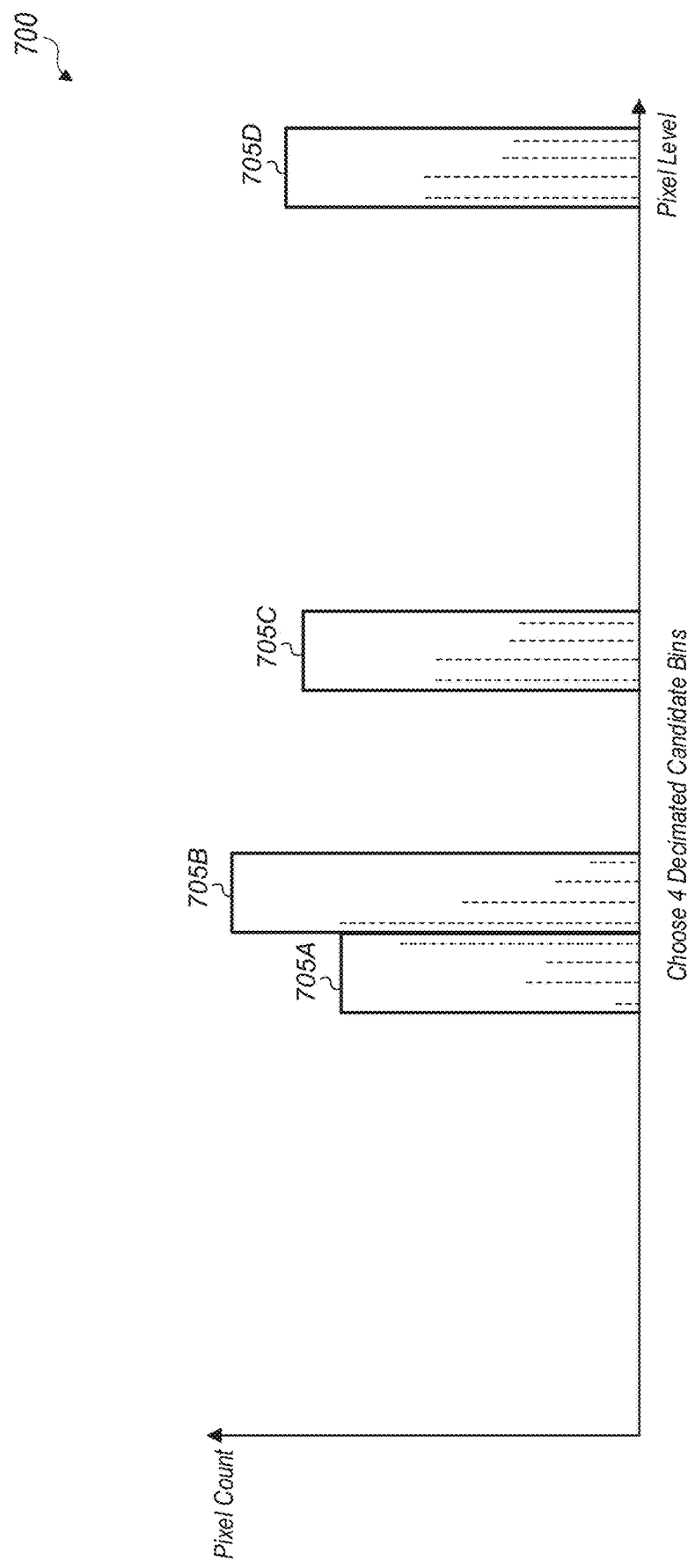
FIG. 7 illustrates a diagram of a selection of the top decimated candidate bins in accordance with one implementation.

Referring now to FIG. 7, a diagram of one implementation of a selection of the top decimated candidate bins from a sample histogram is shown. The discussion of FIG. 7 is a continuation of the discussion of histogram 600 from FIG. 6. After creating candidate bins based on a subset of pixel MSBs as shown in histogram 600, the top four candidate bins with the highest pixel counts are selected. These four selected decimated candidate bins 705A-D are shown as the vertical rectangles in histogram 700. It should be understood that the selection of the top four decimated candidate bins 705A-D is merely indicative of one implementation. In other implementations, another number (e.g., 2, 8) of the top decimated candidate bins can be selected from the decimated histogram. In one implementation, while the top four decimated candidate bins 705A-D are selected for the first histogram, the top four decimated candidate bins are selected for the second histogram. Next, these top bins from the two histograms are combined to form a third histogram. Then, the top bins from the third histogram are selected and used to derive a palette table.

Figure 8:
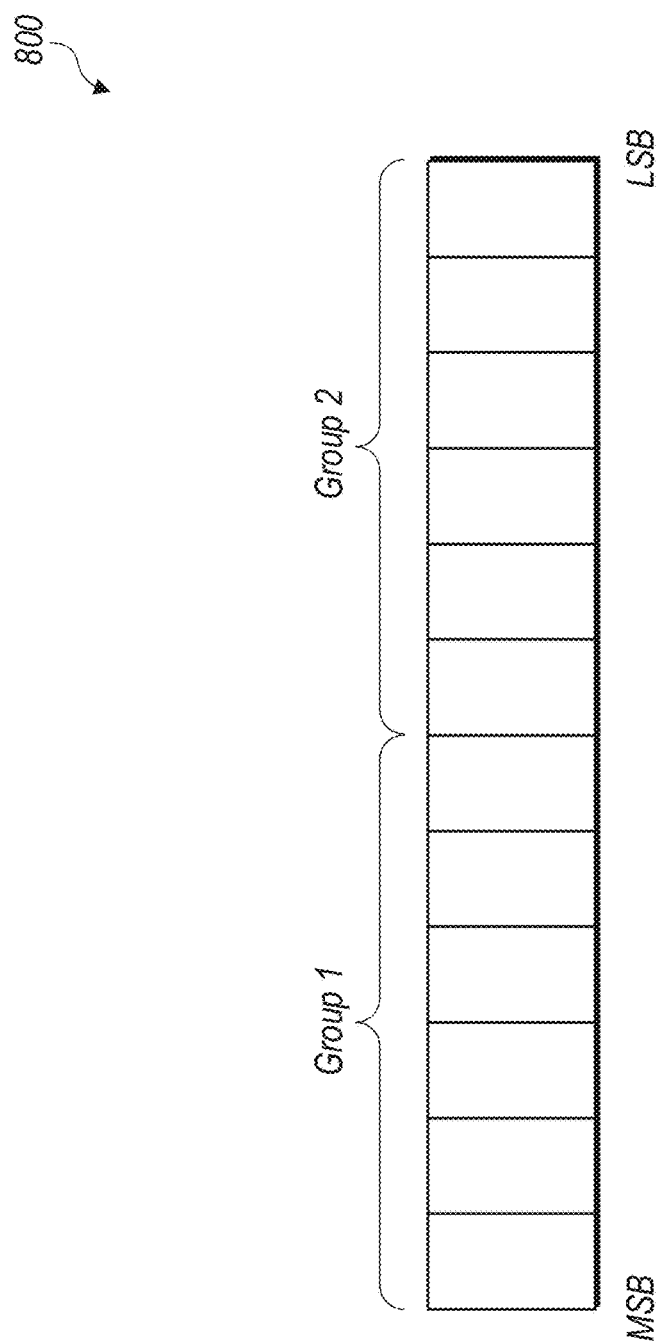
FIG. 8 is a diagram of one implementation of the bits of a pixel component.

Turning now to FIG. 8, a diagram of one implementation of the bits of a pixel component 800 is shown. Pixel component 800 is representative of any number of bits for storing one of the different color values for the particular color space of the source image or video frame. For example, in one implementation, three separate instances of pixel component 800 are used to encode the red, green, and blue color values for each pixel for an image in the red, green, and blue (RGB) color space. Alternatively, in another implementation, three separate instances of pixel component 800 store the luminance and chrominance values for each pixel in the (YUV) color space. In other implementations, pixel component 800 can encode each pixel component value of pixels in other types of color spaces. More generally, pixel component 800 can be referred to as an index into a color space.

In one implementation, a first histogram is calculated for a pixel block of an image/frame using the group 1 bits of pixel component 800 while excluding the group 2 bits of pixel component 800. As shown, the group 1 bits include six bits, but it should be understood this is merely indicative of one implementation. The top candidate bins are chosen from the first histogram, with the number of top candidate bins that are chosen varying according to the implementation. In parallel with the first histogram being calculated, a second histogram is calculated for the pixel block using the group 2 bits of pixel component 800 while excluding the group 1 bits of pixel component 800. As shown, the group 2 bits include six bits, but it should be understood this is merely indicative of one implementation. As with the first histogram, the top candidate bins are chosen from the second histogram, with the number of top candidate bins that are chosen varying according to the implementation.

Next, a third histogram is calculated using all of the bits of pixel component 800 but only for those top candidate bins that were selected during the first and second histograms. Each bin that was selected from the first histogram is combined with a bin from the second histogram to create a bin of the third histogram. The top bins from the third histogram are selected and used to derive a palette table. This palette table is then used to encode the image/video block.

Figure 9:
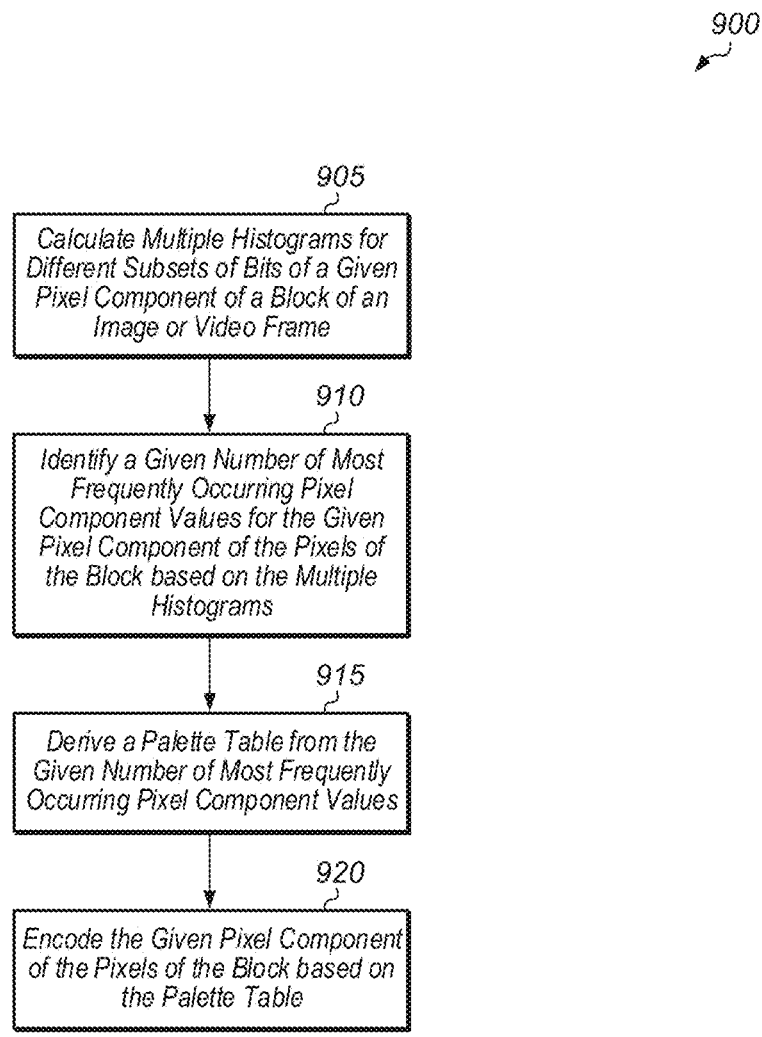
FIG. 9 is a generalized flow diagram illustrating one implementation of a method for performing palette table mode encoding in a memory efficient fashion.
Figure 10:
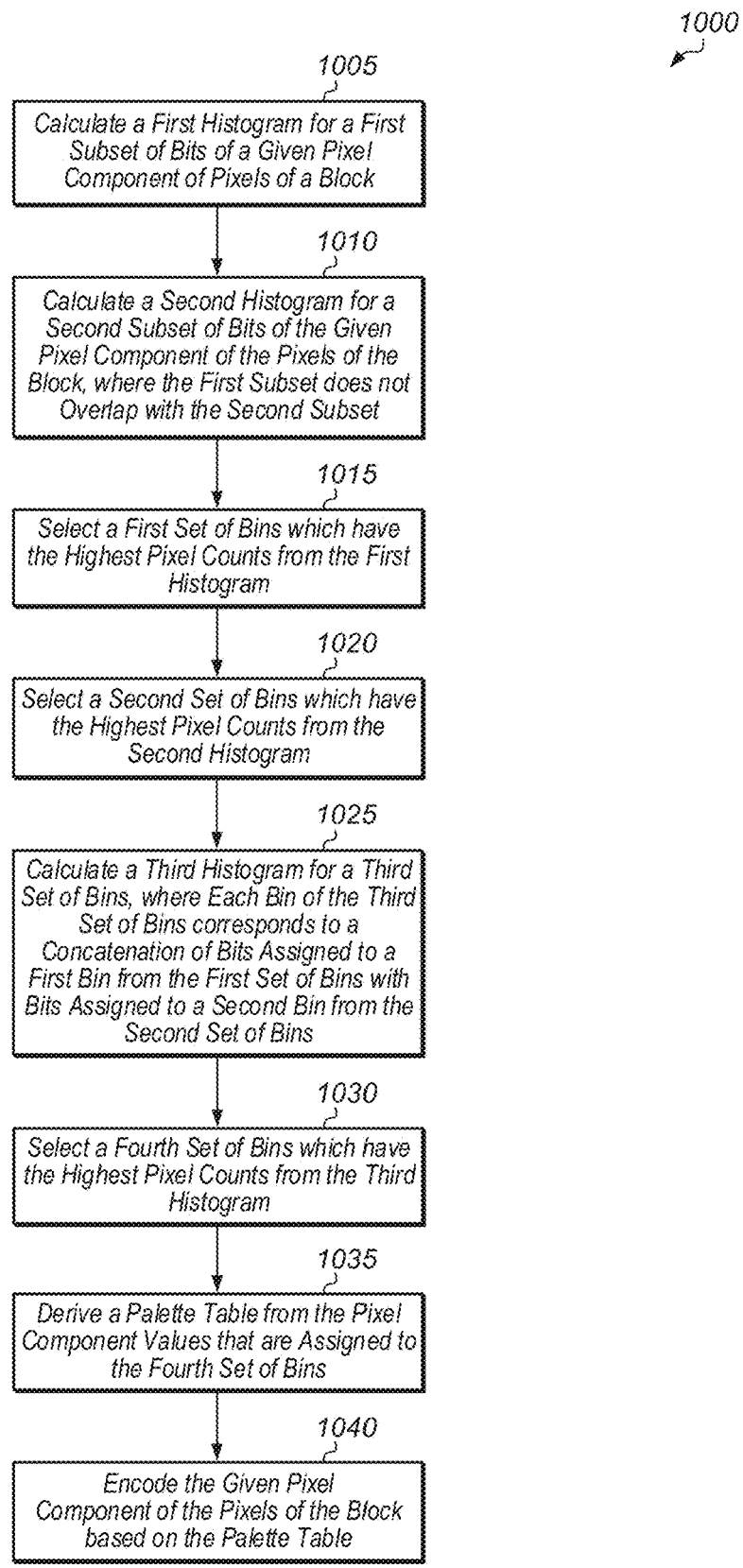
FIG. 10 is a generalized flow diagram illustrating one implementation of a method for calculating multiple histograms for palette table generation.
Figure 11:
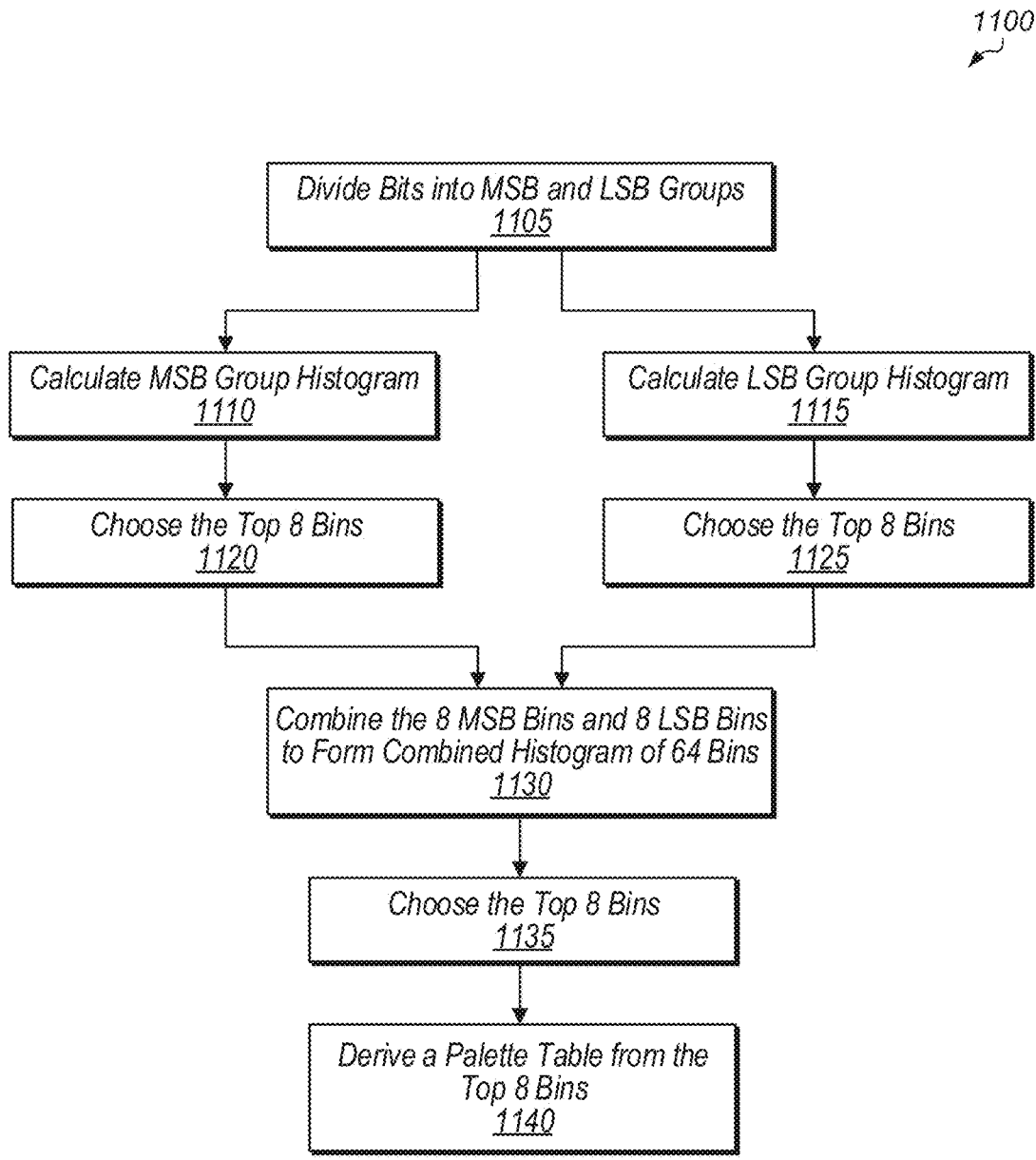
FIG. 11 is a generalized flow diagram illustrating one implementation of a method for generating histograms in parallel as part of palette table derivation.
Figure 12:
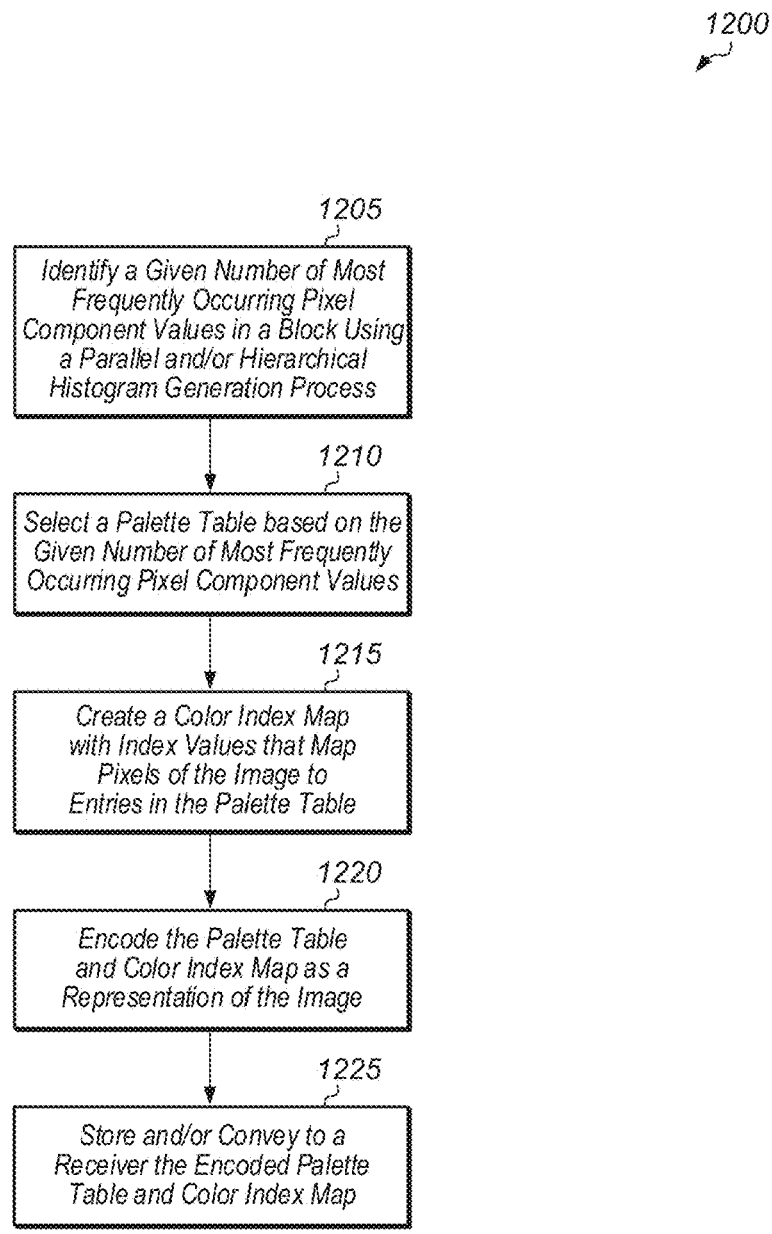
FIG. 12 is a generalized flow diagram illustrating one implementation of a method for encoding a video/image block using a palette table.

Referring now to FIG. 9, one implementation of a method 900 for performing palette table mode encoding in a memory efficient fashion is shown. For purposes of discussion, the steps in this implementation and those of FIG. 10-12 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900.

An encoder calculates multiple histograms for different subsets of bits of a given pixel component of pixels of a block of an image or video frame (block 905). Examples of ways to implement block 905 are described in method 1000 of FIG. 10 and method 1100 of FIG. 11. Other techniques for implementing block 905 can also be employed. Next, the encoder identifies a given number of most frequently occurring pixel component values for the given pixel component of the pixels of the block based on the multiple histograms (block 910). Then, the encoder derives a palette table from the given number of most frequently occurring pixel component values (block 915). Next, the encoder encodes the given pixel component of the pixels of the block based on the palette table (block 920). After block 920, method 900 ends. It is noted that method 900 can be repeated for each separate pixel component (e.g., luminance, chrominance) of the pixels of the block. Method 900 can also be repeated for the other blocks of the image/frame, and for subsequent video frames of a video sequence.

Turning now to FIG. 10, one implementation of a method 1000 for calculating multiple histograms for palette table generation is shown. An encoder calculates a first histogram for a first subset of bits of a given pixel component of pixels of a block (block 1005). In one implementation, the given pixel component is a red, green, or blue pixel component and the block is represented in the RGB color space. In another implementation, the given pixel component is a luminance or chrominance pixel component and the block is represented in the YCbCr color space. In a further implementation, the given pixel component is a combination of two or more pixel components. For example, in one implementation, the given pixel component is a 24-bit value with 8 bits for the red component, 8 bits for the green component, and 8 bits for the blue component. In other implementations, the given pixel component can store other types of values that represent the pixels of the block.

The encoder calculates a second histogram for a second subset of bits of the given pixel component of pixels of the block, where the first subset does not overlap with the second subset (block 1010). For example, in one implementation, if each pixel is represented with a 12-bit value, then the first subset of bits are the 6 most significant bits (MSBs) of the 12-bit value and the second subset of bits are the 6 least significant bits (LSBs) of the 12-bit value. In other implementations, the first subset and the second subset can correspond to other numbers of bits of the pixel component value. In one implementation, blocks 1005 and 1010 are performed in parallel.

Next, the encoder selects a first set of bins which have the highest pixel counts from the first histogram (block 1015). Also, the encoder selects a second set of bins which have the highest pixel counts from the second histogram (block 1020). Then, the encoder calculates a third histogram for a third set of bins, where each bin of the third set of bins corresponds to a concatenation of bits assigned to a first bin from the first set of bins with bits assigned to a second bin from the second set of bins (block 1025). The third set of bins include all possible combinations of the first set of bins with the second set of bins. For example, if the first set of bins includes eight bins and the second set of bins includes eight bins, then the third set of bins will include 64 bins. In other words, each bin from the first set of bins is concatenated with each bin from the second set of bins to generate the third set of bins. Next, the encoder selects a fourth set of bins which have the highest pixel counts among the third set of bins from the third histogram (block 1030). The number of bins that are included in the fourth set of bins can vary according to the implementation. Then, the encoder derives a palette table from pixel component values that are assigned to the fourth set of bins (block 1035). Next, the encoder encodes the given pixel component of the pixels of the block based on the palette table (block 1040). After block 1040, method 1000 ends. It is noted that method 1000 can be repeated for each block of pixels of an image or video frame.

Referring now to FIG. 11, one implementation of a method 1100 for generating histograms in parallel as part of palette table derivation is shown. An encoder divides pixel component value bits into MSB and LSB groups for a block of an image or video frame (block 1105). It is noted that the block can be referred to more generally as a "coding unit". The size of the coding unit (e.g., 8×8 block) can vary according to the implementation. In another implementation, the coding unit is the entirety of an image or video frame. In other implementations, the coding unit is any of various other portions of the image, or the coding unit can correspond to multiple images (e.g., video frames of a video sequence).

Next, in parallel, the encoder calculates a histogram for the MSB group (block 1110) while also calculating a histogram for the LSB group (block 1115). Each bin includes those pixel component values which match the portion of bits assigned to the bin. For example, in one implementation, the bit-width of the pixel component value is eight and the MSB portion is four bits, and a first bin is assigned bits "1111", a second bin is assigned bits "1110", and so on. In this implementation, pixel component values of "11111111", "11111110", "11111101", "11111100", "11111011", "11111010", "11111001", "11111000", "11110111", "11110110", "11110101", "11110100", "11110011", "11110010", "11110001", and "11110000" are assigned to the first bin. Also, pixel component values of "11101111", "11101110", "11101101", "11101100", "11101011", "11101010", "11101001", "11101000", "11100111", "11100110", "11100101", "11100100", "11100011", "11100010", "11100001", and "11100000" are assigned to the second bin. This pattern continues for the other bins of the MSB group histogram. Pixel component values of the LSB group can be assigned to bins of the LSB group histogram in a similar fashion.

Then, the encoder chooses the top 8 bins from the MSB group histogram (block 1120) and the encoder chooses the top 8 bins from the LSB group histogram (block 1125). In other implementations, the encoder can choose other numbers of the top (i.e., highest pixel count) bins from the MSB and LSB group histograms. As used herein, the term "bin" is defined as a collection of pixels from a coding unit with pixel component values that match a particular bit assignment. For the MSB and LSB group histograms, each particular bit assignment for a given bin includes a number of bits that is less than the bit-width of the pixel component value.

After blocks 1120 and 1125, the encoder combines the 8 MSB bins with the 8 LSB bins to form a combined histogram of 64 bins (block 1130). Next, the encoder chooses the top 8 bins from the combined histogram (block 1135). In other implementations, the encoder chooses other numbers of top bins from the combined histogram. Then, the encoder derives a palette table from the top 8 bins (block 1140). After block 1140, method 1100 ends.

Turning now to FIG. 12, one implementation of a method 1200 for encoding a video/image block using a palette table is shown. An encoder identifies a given number of most frequently occurring pixel component values in a block using a parallel and/or hierarchical histogram generation process (block 1205). Different examples of using a parallel and/or hierarchical histogram generation process to identify a given number of most frequently occurring pixel component values (i.e., the most prominent colors) in a block are described in methods 1000 and 1100 (of FIG. 10-11). Any of these methods, or other similar methods, can be used to implement block 1205. The given number can be any suitable integer value (e.g., 8, 16, 32), with the value varying according to the implementation.

Next, the encoder selects a palette table based on the given number of most frequently occurring pixel component values (block 1210). In one implementation, the palette table includes the seven most frequently occurring pixel component values, allowing the index into the table to be encoded with three bits, with the eighth index used for escape pixels which do not map to any values in the palette table. In other implementations, the palette table has other numbers of entries for other numbers of the most frequently occurring pixel component values. In one implementation, each pixel component (e.g., luminance, chrominance) has its own palette table. In another implementation, a single palette table is created as a representative combination of the separate pixel components. In a further implementation, the palette table is selected for a single pixel component (e.g., red) and then shared and/or modified to be used with the other pixel components (e.g., blue, green). Alternatives to the above are possible and are contemplated.

Then, a color index map is created with index values that map pixels of the block to entries in the palette table (block 1215). For example, in one implementation, each pixel in the block is converted to an index into the palette table, with the color index map including an index for each pixel in the block. If the pixel has a value that is not included within the palette table, then the pixel can be encoded as an escape pixel, and the actual value of the pixel can be included in the color index map or in a separate structure. Next, the palette table and color index map are encoded as a representation of the block (block 1220). Any of various encoding techniques for encoding the palette table and for encoding the color index map can be used. Then, the encoded palette table and color index map are stored and/or conveyed to a receiver (block 1225). After block 1225, method 1200 ends. It should be understood that method 1200 can also be used to encode the entirety of an image or video frame rather than just a block of the image/frame.

For implementations that involve sending the encoded palette table and color index map to a receiver, the receiver will include a decoder that will reverse the above steps to recreate the block from the encoded palette table and color index map. The recreated block can then be driven to a display. In one implementation, this process can be repeated for the blocks of each video frame of a video sequence. Alternatively, the encoded palette table can be sent for the entirety of a first video frame, and then some number of subsequent video frames can reuse this palette table. For the subsequent video frames, only the color index map for the video frame is sent to the receiver. In a further implementation, an encoded palette table generated for a block of a frame is reused for other blocks of the frame and/or blocks of other frames. In some cases, a palette table for a given block is derived from the palette table corresponding to another block. For example, in one implementation, a delta palette table (i.e., difference palette table) is applied to the palette table of a neighboring block to generate the palette table for a given block. Other ways of deriving a new palette table from a previously used palette table are possible and are contemplated.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory; and
an encoder comprising circuitry coupled to the memory, wherein the encoder is configured to:
calculate multiple histograms for different subsets of bits of a given pixel component of pixels of a block;
identify a given number of most frequently occurring values for the given pixel component of the pixels of the block based on the multiple histograms;
derive a palette table from the given number of most frequently occurring values; and
encode the given pixel component of the pixels of the block based on the palette table.

2. The system as recited in claim 1, wherein calculating multiple histograms for different subsets of bits of the given pixel component of the pixels of the block comprises:
calculating a first histogram for a first subset of bits of the given pixel component of the pixels of the block; and
calculating a second histogram for a second subset of bits of the given pixel component of the pixels of the block, wherein the first subset of bits does not overlap with the second subset of bits.

3. The system as recited in claim 2, wherein identifying the given number of most frequently occurring values for the given pixel component of the pixels of the block based on the multiple histograms comprises:
selecting a first set of bins which have a highest pixel count from the first histogram and selecting a second set of bins which have a highest pixel count from the second histogram;
calculating a third histogram for a third set of bins, wherein each bin of the third set of bins corresponds to a concatenation of bits assigned to a first bin from the first set of bins with bits assigned to a second bin from the second set of bins; and
selecting a fourth set of bins which have a highest pixel count among the third set of bins, wherein pixel component values that are assigned to the fourth set of bins are the given number of most frequently occurring values for the given pixel component of the pixels of the block.

4. The system as recited in claim 1, wherein a combination of the first subset of bits and the second subset of bits comprise the entirety of the given pixel component.

5. The system as recited in claim 1, wherein:
the given pixel component has N bits;
the first subset of bits includes N/2 most significant bits of the given pixel component;
the second subset of bits includes N/2 least significant bits of the given pixel component; and
N is a positive, even integer.

6. The system as recited in claim 1, wherein:
the given pixel component is a red, green, or blue pixel component; and
the block is a portion of an image or video frame.

7. The system as recited in claim 1, wherein:
the given pixel component is a luminance or chrominance pixel component; and
the block is a portion of an image or video frame.

8. A method comprising:
calculating, by an encoder, multiple histograms for different subsets of bits of a given pixel component of pixels of a block;
identifying a given number of most frequently occurring values for the given pixel component of the pixels of the block based on the multiple histograms;
deriving a palette table from the given number of most frequently occurring values; and
encoding the given pixel component of the pixels of the block based on the palette table.

9. The method as recited in claim 8, wherein calculating multiple histograms for different subsets of bits of the given pixel component of the pixels of the block comprises:
calculating a first histogram for a first subset of bits of the given pixel component of the pixels of the block; and
calculating a second histogram for a second subset of bits of the given pixel component of the pixels of the block, wherein the first subset of bits does not overlap with the second subset of bits.

10. The method as recited in claim 9, wherein identifying the given number of most frequently occurring values for the given pixel component of the pixels of the block based on the multiple histograms comprises:
selecting a first set of bins which have a highest pixel count from the first histogram and selecting a second set of bins which have a highest pixel count from the second histogram;
calculating a third histogram for a third set of bins, wherein each bin of the third set of bins corresponds to a concatenation of bits assigned to a first bin from the first set of bins with bits assigned to a second bin from the second set of bins; and
selecting a fourth set of bins which have a highest pixel count among the third set of bins, wherein pixel component values that are assigned to the fourth set of bins are the given number of most frequently occurring values for the given pixel component of the pixels of the block.

11. The method as recited in claim 8, wherein a combination of the first subset of bits and the second subset of bits comprise the entirety of the given pixel component.

12. The method as recited in claim 8, wherein:
the given pixel component has N bits;
the first subset of bits includes N/2 most significant bits of the given pixel component;
the second subset of bits includes N/2 least significant bits of the given pixel component; and
N is a positive, even integer.

13. The method as recited in claim 8, wherein:
the given pixel component is a red, green, or blue pixel component; and
the block is a portion of an image or video frame.

14. The method as recited in claim 8, wherein:
the given pixel component is a luminance or chrominance pixel component; and
the block is a portion of an image or video frame.

15. An apparatus comprising:
a memory storing a block of pixels and program instructions; and
a processor coupled to the memory, wherein the program instructions are executable by the processor to:
calculate multiple histograms for different subsets of bits of a given pixel component of the block of pixels;
identify a given number of most frequently occurring values for the given pixel component of the block of pixels based on the multiple histograms;
derive a palette table from the given number of most frequently occurring values; and
encode the given pixel component of the block of pixels based on the palette table.

16. The apparatus as recited in claim 15, wherein calculating multiple histograms for different subsets of bits of the given pixel component of the pixels of the block comprises:
calculating a first histogram for a first subset of bits of the given pixel component of the pixels of the block; and
calculating a second histogram for a second subset of bits of the given pixel component of the pixels of the block, wherein the first subset of bits does not overlap with the second subset of bits.

17. The apparatus as recited in claim 16, wherein identifying the given number of most frequently occurring values for the given pixel component of the pixels of the block based on the multiple histograms comprises:
selecting a first set of bins which have a highest pixel count from the first histogram and selecting a second set of bins which have a highest pixel count from the second histogram;
calculating a third histogram for a third set of bins, wherein each bin of the third set of bins corresponds to a concatenation of bits assigned to a first bin from the first set of bins with bits assigned to a second bin from the second set of bins; and
selecting a fourth set of bins which have a highest pixel count among the third set of bins, wherein pixel component values that are assigned to the fourth set of bins are the given number of most frequently occurring values for the given pixel component of the pixels of the block.

18. The apparatus as recited in claim 15, wherein a combination of the first subset of bits and the second subset of bits comprise the entirety of the given pixel component.

19. The apparatus as recited in claim 15, wherein:
the given pixel component has N bits;
the first subset of bits includes N/2 most significant bits of the given pixel component;
the second subset of bits includes N/2 least significant bits of the given pixel component; and
N is a positive, even integer.

20. The apparatus as recited in claim 15, wherein:
the given pixel component is a red, green, or blue pixel component; and
the block is a portion of an image or video frame.

* * * * *